US012649341B1

(12) United States Patent　　　(10) Patent No.:　US 12,649,341 B1

Pedrini　　　　　　　　　　　　(45) Date of Patent:　　Jun. 9, 2026

(54) RETRACTABLE CABLE ASSEMBLY FOR A HITCH OR TOW BAR

(71) Applicant: FABIO PEDRINI & PARTNERS s.r.l., Casalecchio di Reno (IT)

(72) Inventor: Fabio Pedrini, Bologna (IT)

(73) Assignee: Fabio Pedrini & Partners s.r.l., Casalecchio di Reno (IT)

( * ) Notice: Subject to any disclaimer, the term of this patent is extended or adjusted under 35 U.S.C. 154(b) by 685 days.

(21) Appl. No.: 17/985,462

(22) Filed: Nov. 11, 2022

Related U.S. Application Data

(60) Provisional application No. 63/280,399, filed on Nov. 17, 2021.

(51) Int. Cl.
B60D 1/54　　　　(2006.01)

(52) U.S. Cl.
CPC ..................................... B60D 1/54 (2013.01)

(58) Field of Classification Search
CPC ....................................................... B60D 1/54
USPC ...................................................... 280/491.1
See application file for complete search history.

(56) References Cited

U.S. PATENT DOCUMENTS

| | | | |
|---|---|---|---|
| 3,326,573 | A | 6/1967 | Neitzey, Jr. |
| 4,807,899 | A | 2/1989 | Belcher |

| | | | | | |
|---|---|---|---|---|---|
| 5,072,964 | A | * | 12/1991 | Schule | ...................... B60D 1/38 |
| | | | | | 280/511 |
| 6,375,211 | B1 | | 4/2002 | MacKarvich | |
| 6,572,132 | B1 | | 6/2003 | Saul | |
| 6,581,952 | B1 | * | 6/2003 | MacKarvich | ............ B60D 1/28 |
| | | | | | 280/507 |
| 6,752,412 | B2 | | 6/2004 | Saul | |
| 6,971,661 | B1 | | 12/2005 | MacKarvich | |
| 7,290,755 | B1 | * | 11/2007 | Thibodeaux | ............. B60D 1/40 |
| | | | | | 254/323 |
| 2003/0214115 | A1 | * | 11/2003 | Saul | ......................... B60D 1/18 |
| | | | | | 280/480.1 |

* cited by examiner

*Primary Examiner* — Valentin Neacsu
*Assistant Examiner* — Mohamed M Medani
(74) *Attorney, Agent, or Firm* — Wong Meyer Smith & McConnell

(57)　　　　　　　ABSTRACT

An auxiliary engagement system for a bar adapted to be engaged with a hitch receiver of a vehicle-mounted trailer hitch having an auxiliary engagement area includes a housing carried by the bar, and a cable that is extendibly and retractably engaged with the housing. The cable has a distal end to which a hook is secured, and the hook is engageable with the auxiliary engagement area of the trailer hitch. A retainer, in the form of a trigger, is movably mounted to the housing for movement between an engaged position, in which the retainer prevents outward movement of the cable relative to the housing, and a disengaged position in which the retainer allows outward movement of the cable relative to the housing. The cable is positioned within an internal passage defined by the bar rearwardly of the housing, and is positioned externally of the bar forwardly of the housing.

11 Claims, 4 Drawing Sheets

RETRACTABLE CABLE ASSEMBLY FOR A HITCH OR TOW BAR

CROSS-REFERENCE TO RELATED APPLICATION

This application claims the benefit of provisional application Ser. No. 63/280,399 filed Nov. 17, 2021, the entire contents of which are hereby incorporated by reference.

BACKGROUND AND SUMMARY

When securing a tow bar or equipment carrier to a vehicle trailer hitch having a hitch receiver, it is commonly known to employ a primary means of engagement between the hitch receiver and the tow bar or equipment carrier, as well as a secondary means of engagement in the event of a failure of the primary means of engagement. In a typical scenario, a forward end portion of the tow bar or the mounting bar of an equipment carrier is inserted into an internal passage defined by the hitch receiver, and the primary means of engagement involves securing the forward end portion of the tow bar or mounting bar to the hitch receiver. This is often accomplished, for example, using a cross-pin or bolt extending through aligned passages or openings in the walls of the hitch receiver and the tow bar or mounting bar. The secondary means of engagement is commonly a loose cable or chain, which is connected at a rear end to the tow bar or equipment carrier and at a front end to an engagement area on the trailer hitch, typically located adjacent the hitch receiver. The engagement area may be in the form of an eye or any other engagement structure providing an opening, and the cable or chain typically has a hook at its front end that can be hooked onto the eye or other engagement structure. The cable or chain is separate from the hitch receiver and from the tow bar or the mounting bar, and may be secured in place using hooks at either end.

This invention contemplates a secondary means of engagement that is secured to and carried by the tow bar or mounting bar.

In accordance with the present invention, a auxiliary engagement system for a mounting bar or tow bar adapted to be engaged with a hitch receiver of a vehicle-mounted trailer hitch, which has an auxiliary engagement area, includes a housing secured to and carried by the bar, and a cable that is extendibly and retractably engaged with the housing. The cable has a distal end to which a hook is secured, and a retainer movably mounted to the housing for movement between an engaged position, in which the retainer prevents outward movement of the cable relative to the housing, and a disengaged position in which the retainer allows outward movement of the cable relative to the housing.

The housing may be secured to bar so as to extend outwardly from an outer surface defined by the bar. The cable is positioned within an internal passage defined by the bar rearwardly of the housing, and is positioned externally of the bar forwardly of the housing.

The housing may define a passage within which the cable is movably positioned, and the retainer may include a toothed engagement surface that is positioned against the cable when the retainer is in the engaged position, and that is positioned away from the cable when the retainer is in the disengaged position.

The retainer may be in the form of a trigger that is pivotably mounted to the housing, and the toothed engagement surface may be provided on the trigger.

A spring may be interposed between the housing and the trigger, and is operable to bias the trigger toward the engaged position of the retainer.

The bar may include one or more openings, and the housing may include one or more mounting members positioned within the one or more openings of the bar for maintaining the housing in position on the bar.

The invention also contemplates a method of preventing a bar from disengagement with a hitch receiver of a vehicle-mounted trailer hitch having an auxiliary engagement area, substantially in accordance with the foregoing summary.

Other aspects, features and advantages of the invention will become apparent to those skilled in the art from the following detailed description and accompanying drawings. It should be understood, however, that the detailed description and specific examples, while indicating certain embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements can be several views, and in which.

Figure 1:
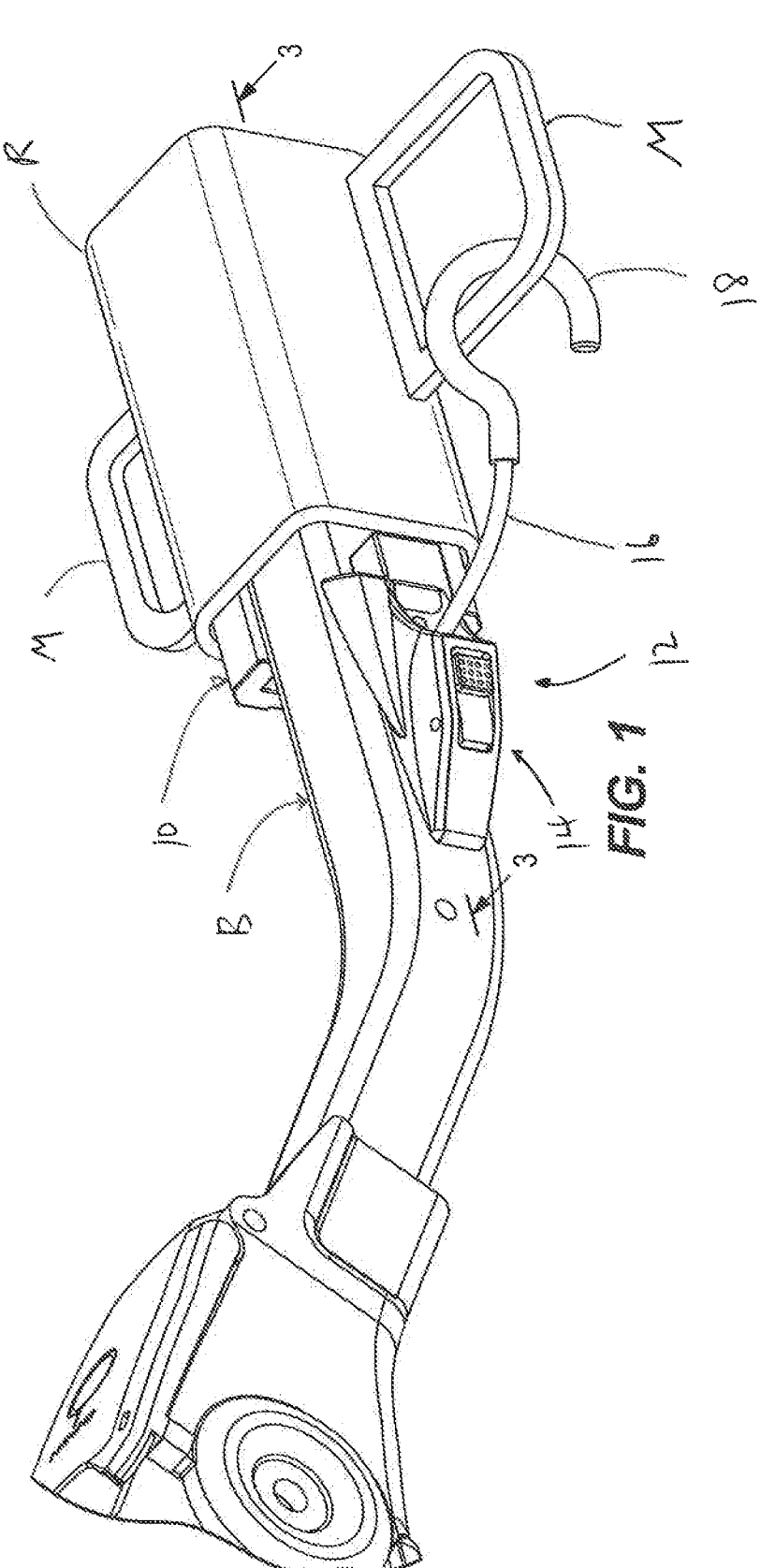
FIG. 1 is an isometric view of a cable-type retainer for an equipment carrier or tow bar in accordance with the present invention, in which the equipment carrier or tow bar is engageable with a vehicle-mounted hitch receiver.

In describing the embodiments of the invention which are illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the words "connected," "attached," or terms similar thereto are often used. They are not limited to direct connection or attachment, but include connection or attachment to other elements where such connection or attachment is recognized as being equivalent by those skilled in the art.

DETAILED DESCRIPTION

The various features and advantageous details of the subject matter disclosed herein are explained more fully with reference to the non-limiting embodiments described in detail in the following description.

Referring initially to FIG. 1, a vehicle-mounted trailer hitch includes a hitch receiver shown at R that has a series of walls which cooperate to define an internal passage. The trailer hitch also includes auxiliary engagement structure, which in the illustrated embodiment is shown as a pair of generally rectangular engagement members M that are secured to and extend outwardly in opposite directions from the sidewalls of hitch receiver R. In the embodiment shown in FIG. 1, a mounting bar B of an equipment carrier is adapted to be received within the internal passage of hitch receiver R. The mounting bar B may be employed to secure any type of equipment carrier, such as a bicycle carrier, to the hitch receiver R. Alternatively, a tow bar of a trailer may employed in place of mounting bar B for securing a trailer to the hitch receiver R. Any satisfactory securement arrangement may be employed for providing a primary means of engagement between mounting bar B and hitch receiver R. As noted previously, a cross-pin or bolt (not shown) may be used, or alternatively an equipment carrier may be provided with an internal automatic tightening system for securing the mounting bar B to the hitch receiver R, such as is shown in pending U.S. provisional patent application Ser. No. 17/978, 324 filed Nov. 1, 202s (hereby incorporated by reference in its entirety). In the event the mounting bar B has a cross-section smaller than that of the internal passage defined by the walls of hitch receiver R, an adapter 10 may be employed to allow the smaller mounting bar B to be used with the larger hitch receiver R, in a manner as is known.

An auxiliary retainer cable assembly 12 in accordance with the present invention is secured to and carried by the mounting bar B. The auxiliary retainer cable assembly 12 generally includes a housing 14 and a cable 16 having a hook 18 at its distal end, with the cable 16 being extendibly and retractably engaged with the housing 14.

Figure 2:
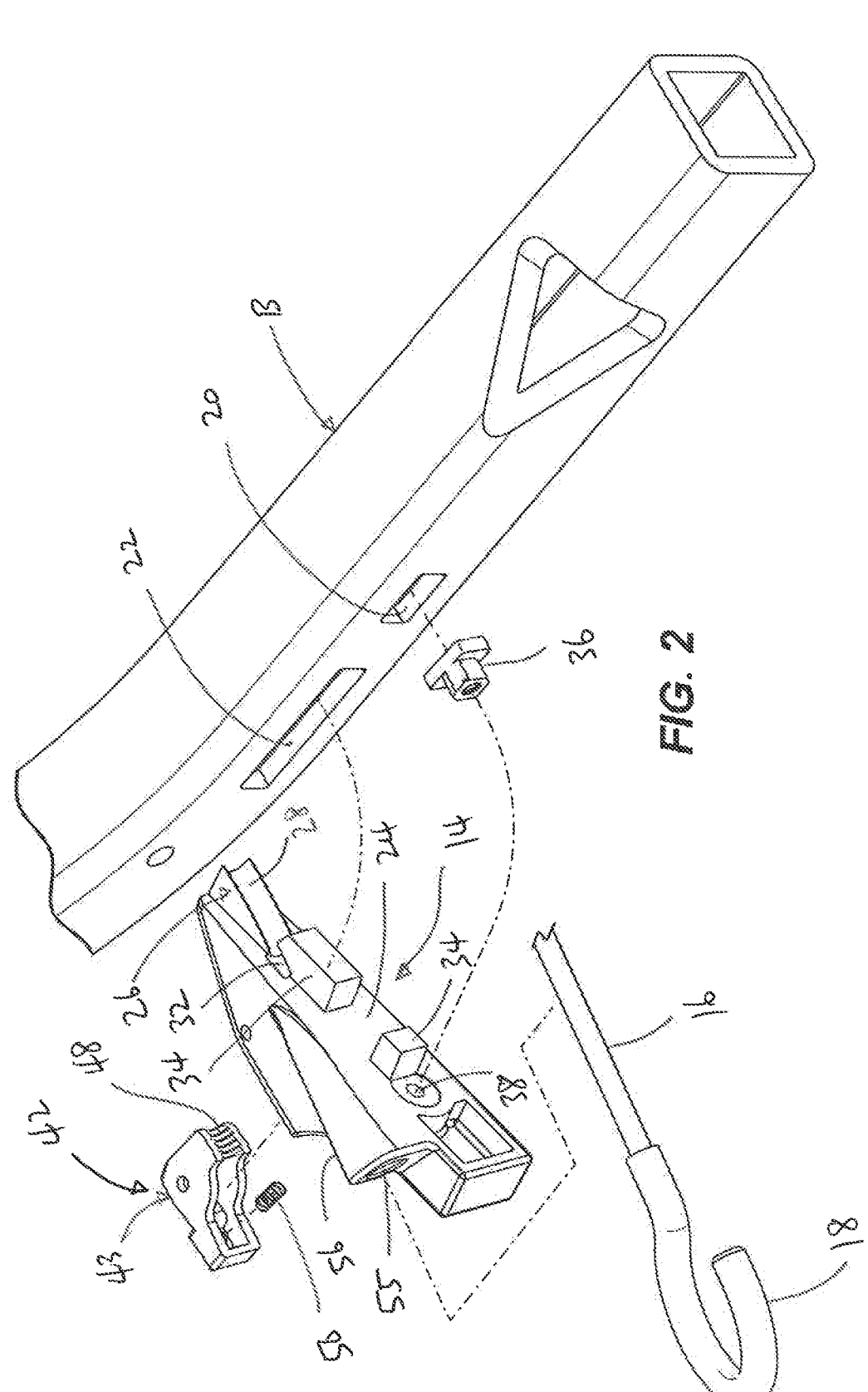
FIG. 2 is an exploded isometric view of the cable-type retainer of FIG. 1.

As shown in FIG. 2, the mounting bar B is provided with a front slot 20 and a rear slot 22. The housing 14 has a flat inner surface 24 that is arranged to engage the sidewall of mounting bar B over the slots 20, 22. Toward its rear end, the housing 14 has a ramp 26 that extends inwardly from the housing inner surface 24. The ramp 26 defines an arcuate guide surface 28. A block 30 extends inwardly from the inner surface 24 forwardly of ramp 26. An opening 32 is formed in inner surface 24 between the rearward end of block 30 and the forward end of ramp 26, and the cable 16 is adapted to extend through the opening 32. Ramp 26 and block 30 are configured to be received within the rear slot 22 in the sidewall of mounting bar B when the inner surface 24 of housing 14 is positioned against the sidewall of mounting bar B. The housing 14 may define a recessed area 33 (FIGS. 3, 4) at its rearward end, within which the rearward edge of the slot 22 is received when the inner surface 24 of housing 14 is positioned against the sidewall of mounting bar B.

Toward its front end, the housing 14 has a front locating block 34 that extends inwardly from the housing inner surface 24. The front locating block 34 is configured to be received within the front slot 20 in the sidewall of mounting bar B when the inner surface 24 of housing 14 is positioned against the sidewall of mounting bar B. A T-nut 36 is adapted to be positioned within the front slot 20 adjacent the locating block 34. The wings of T-nut 36 are positioned vertically and against the inside surface of the mounting bar sidewall adjacent the slot 20, so that the neck of the T-nut 36 and the locating block 34 occupy the front slot 20. A passage 38 extends from inner surface 24 of housing 14, and is configured so as to be in alignment with a threaded passage in the neck of T-nut 36. A screw 39 (FIGS. 3, 4) extends through the passage 38 and into the threaded passage in the neck of T-nut 36, for securing housing 14 against the sidewall of mounting bar B. Engagement of the neck of the T-nut 36 and the locating block 34 within the front slot 20 prevent axial forward-rearward movement of housing 14 relative to mounting bar B, such that the rear edge of slot 22 is maintained within the recessed area 33 in order to securely maintain housing 14 in position on mounting bar B.

Figure 3:
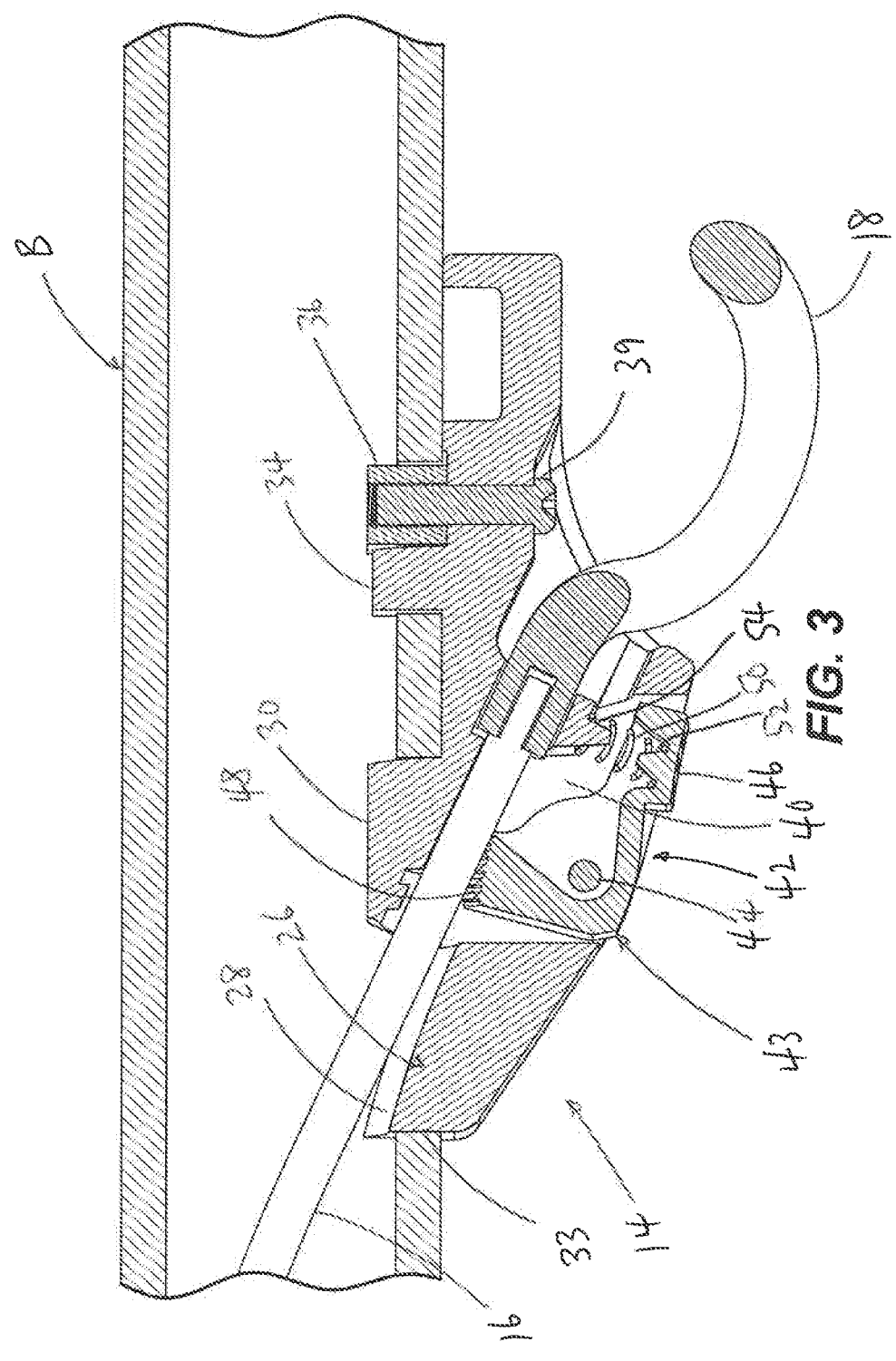
FIG. 3 is a partial isometric view taken along line 3-3 of FIG. 1, showing an engagement mechanism of the cable-type retainer in an engaged position.
Figure 4:
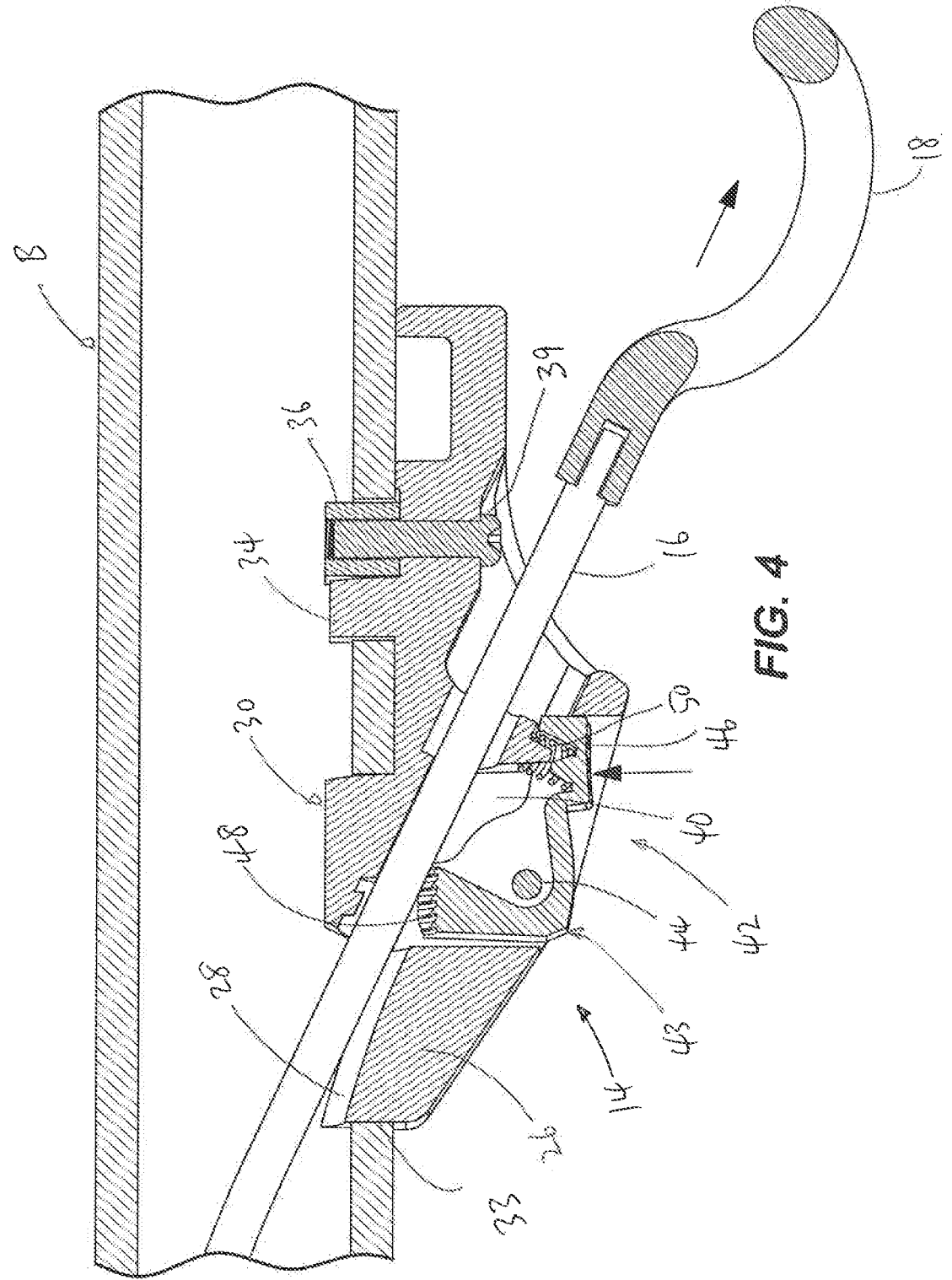
FIG. 4 is a view similar to FIG. 3, showing the engagement mechanism of the cable-type retainer in a release position.

As shown in FIGS. 3 and 4, the housing 14 includes a cavity 40, and a trigger-type engagement mechanism 42 is pivotably mounted to the housing 14 within the cavity 40 via a pivot pin 44. The engagement mechanism 42 includes a pivotable trigger 43 having an external manual engagement surface 46 and an internal toothed retainer surface 48. A spring 50 is positioned within the cavity 40, and bears between the trigger 43 and the housing 14. One end of the spring 50 is positioned over a button 52 extending inwardly from the manual engagement surface 46 of trigger 43, and the other end of the spring 50 is positioned over a projection 54 defined by housing 14 within the cavity 40. The spring 50 functions to bias the trigger 43 toward an engaged position.

The cable 16 extends from the hook 18, through the cavity 40 of housing 14 and the opening 32, which communicates with the cavity 40, and through the slot 22 into the interior of the mounting bar B.

In operation, once the front portion of the mounting bar B has been engaged within the internal passage of the hitch receiver R and secured thereto, the cable 16 can be moved from its retracted position as shown in FIG. 3 to an extended position for engagement with the engagement member M. To accomplish this, the user manually depresses the trigger 43, using the manual engagement surface 46, against the force of spring 50, to move the toothed retainer surface 48 of trigger 43 out of engagement with the cable 16. Hook 18 can then be grasped so as to draw cable 16 outwardly and enable it to be hooked onto the engagement member M. The user then releases manual engagement with the manual engagement surface 46, which enables trigger 43 to pivot about the pivot pin 44 to its engaged position under the influence of spring 50, in which the toothed retainer surface 48 of retainer 42 is engaged against the cable 16, to prevent cable 16 from being further extended relative to housing 14.

Once the hook 18 has been initially engaged with the engagement member M, the cable 16 is moved rearwardly so that the hook 18 remains in engagement with engagement member M. This can be accomplished by maintaining the trigger 43 in its release position while an axial rearward force is applied to the cable 16, either by application of a rearward force on the hook 18 or on the cable 16 itself. The cable 16 has sufficient stiffness to enable it to be moved rearwardly in this manner. The trigger 43 can then be released so that it moves to the engaged position under the influence of spring 50, bringing the toothed retainer surface 48 into contact with the cable 16 so as to prevent it from being moved forwardly.

The teeth of toothed retainer surface 48 are angled rearwardly and inwardly, which causes the teeth to dig into the cable 16 in the event it is subjected to an axial outward force. In this manner, the hook 18 is maintained in engagement with the engagement member M when the trigger 43 is in its engaged position. This orientation of the teeth of toothed retainer surface 48 also enables the user to move the cable 16 rearwardly after the hook 18 has been initially engaged with the engagement member M and the trigger 43 has been moved to the engaged position under the influence of spring 50. The teeth of toothed retainer surface 48 allow such rearward movement of cable 16 while trigger 43 is in its engaged position, but prevent cable 16 from being pulled forwardly while trigger 43 is engaged with cable 16.

When it is desired to disengage the hook 18 from the engagement member M, this series of steps is reversed. That is, trigger 43 is depressed so as to move it to the release position, and the cable 16 is extended to allow hook 18 to be disengaged from the engagement member M. The cable 16 can then be pushed toward housing 14 toward its retracted position in the same manner as described above, either with the trigger 43 in the release position or in the engaged position. When in the retracted position, the end of hook 18 can be placed into a passage 55 defined by a receiver portion 56 defined by housing 14, so the end of hook 18 is not exposed.

It should be understood that the invention is not limited in its application to the details of construction and arrangements of the components set forth herein. The invention is capable of other embodiments and of being practiced or carried out in various ways, and variations and modifications of the foregoing are within the scope of the present invention. The embodiments described herein explain the best modes known for practicing the invention and will enable others skilled in the art to utilize the invention.

I claim:

1. An auxiliary engagement system for a bar adapted to be engaged with a hitch receiver of a vehicle-mounted trailer hitch having an auxiliary engagement area, comprising:
   a housing secured to and carried by the bar, wherein the housing is secured to the bar so as to extend outwardly from an outer surface defined by the bar, wherein the housing defines a passage within which a cable is movably positioned;
   the cable that is extendably and retractably engaged with the housing, wherein the cable is positioned within an internal passage defined by the bar rearwardly of the housing, and is positioned externally of the bar forwardly of the housing, and wherein the cable has a distal end to which a hook is secured; and
   a retainer movably mounted to the housing for movement between an engaged position, in which the retainer prevents outward movement of the cable relative to the housing, and a disengaged position in which the retainer allows outward movement of the cable relative to the housing, and wherein the retainer includes a toothed engagement surface that is positioned against the cable when the retainer is in the engaged position, and that is positioned away from the cable when the retainer is in the disengaged position.

2. The auxiliary engagement system of claim 1, wherein the retainer comprises a trigger that is pivotably mounted to the housing, wherein the toothed engagement surface is provided on the trigger.

3. The auxiliary engagement system of claim 2, further comprising a spring interposed between the housing and the trigger, wherein the spring is operable to bias the trigger toward the engaged position of the retainer.

4. The auxiliary engagement system of claim 1, wherein the bar includes one or more openings and wherein the housing includes one or more mounting members positioned within the one or more openings of the bar for maintaining the housing in position on the bar.

5. An auxiliary engagement system for a bar adapted to be engaged with a hitch receiver of a vehicle-mounted trailer hitch having an auxiliary engagement area, wherein the bar defines an internal passage, comprising:
   a housing secured to and carried by the bar, wherein the housing is secured to the bar so as to extend outwardly from an outer surface defined by the bar and defines a cable passage that communicates between the internal passage of the bar and the exterior of the bar;
   a cable positioned within the cable passage and extendably and retractably movable relative to the housing within the cable passage, wherein the cable defines an outer end that includes an engagement member, wherein a forward portion of the cable is located externally of the housing and a rearward portion of the cable is positioned within the internal passage of the bar; and
   an engagement arrangement movably mounted to the housing for movement between an engaged position in which the engagement arrangement prevents outward movement of the cable relative to the housing, and a disengaged position in which the engagement member enables the cable to be moved outwardly relative to the housing, wherein the engagement arrangement includes a toothed engagement surface that is positioned against cable when the engagement arrangement is in the engaged position, and that is positioned away from the cable when the engagement arrangement is in the disengaged position.

6. The auxiliary engagement system of claim 5, wherein the engagement arrangement comprises a trigger that is pivotably mounted to the housing, wherein the toothed engagement surface is provided on the trigger.

7. The auxiliary engagement system of claim 6, further comprising a spring interposed between the housing and the trigger, wherein the spring is operable to bias of the trigger toward the engaged position of the retainer.

8. The auxiliary engagement system of claim 5, wherein the bar includes one or more openings and wherein the housing includes one or more mounting members positioned within the one or more openings of the bar for maintaining the housing in position on the bar.

9. A method of preventing a bar from disengagement with a hitch receiver of a vehicle-mounted trailer hitch having an auxiliary engagement area, comprising the acts of:
   providing a cable that extends from a housing that is secured to the bar, wherein the cable defines a distal end having a hook, and wherein the cable is positioned within an internal passage defined by the bar rearwardly of the housing, and is positioned externally of the bar forwardly of the housing;
   moving the cable within a passage defined by the housing between an extended and retracted position;
   securing the hook to the auxiliary engagement area of the trailer hitch; and
   maintaining the hook in engagement with the auxiliary engagement area of the trailer hitch via a retainer arrangement associated with the housing, wherein the retainer arrangement is movable between and engaged position and a disengaged position, wherein in the engaged position the retainer arrangement prevents outward movement of the cable relative to the housing, and wherein in the disengaged position the retainer arrangement enables the cable to the moved outwardly relative to the housing; and
   selectively preventing outward movement of the cable relative to the housing when the retainer arrangement is in the engaged position via a toothed engagement surface provided on the retainer arrangement that is positioned against the cable when the retainer is in the engaged position, and that is positioned away from the cable when the retainer is in the disengaged position.

10. The method of claim 9, wherein the retainer arrangement comprises a trigger that is pivotably mounted to the housing, wherein the toothed engagement surface is provided on the trigger.

11. The method of claim 10, further comprising the act of biasing the trigger toward the engaged position of the retainer arrangement.

\* \* \* \* \*